J. D. Dale,
Testing Artesian Wells.
N° 73,513.             Patented Jan. 21, 1868.
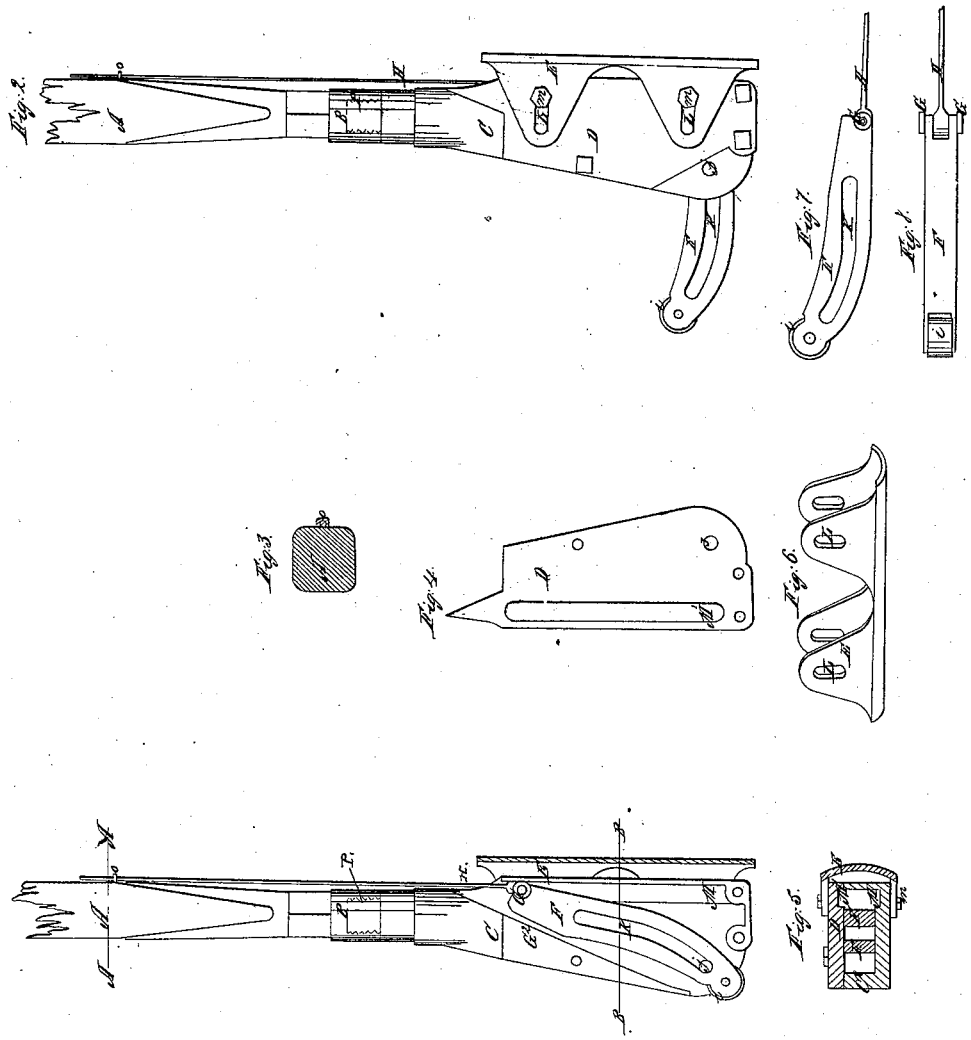

United States Patent Office.

JOHN D. DALE, OF ROCHESTER, NEW YORK.

Letters Patent No. 73,513, dated January 21, 1868.

---

IMPROVEMENT IN APPARATUS FOR DISCOVERING THE FISSURES IN THE SIDES OF WELLS.

---

The Schedule referred to in these Letters Patent and making part of the same.

---

TO ALL WHOM IT MAY CONCERN:

Be it known that I, JOHN D. DALE, of Rochester, in the county of Monroe, and State of New York, have invented certain new and useful Improvements in Devices for Indicating the Position and Form of Crevices in Oil-Wells; and I do hereby declare that the following is a full and exact description thereof, reference being had to the accompanying drawings, making part of this specification.

Figure 1 is a longitudinal section of my improved device with the indicator drawn in.

Figure 2, an elevation with the indicator extended.

Figure 3, section of the pole and rod at the line A A, fig. 1.

Figure 4, view of one side of the head.

Figure 5, section of the head at line B B, fig. 1.

Figure 6, view of the adjusting-gauge.

Figures 7 and 8, views of the indicator detached.

Like letters of reference indicate corresponding parts in all the figures.

The object of my improvement is to ascertain the position and form of crevices in oil-wells, so that the tubing can be accurately adjusted thereto.

The invention consists, first, in the combination of an adjustable gauge with the sliding head, for the purpose of fitting the bore of the well, and second, in the combination of an expanding indicator with the head, for projecting out when entering a cavity, and acting as an arm to indicate its position and size.

The head is simply a hollow block, of suitable form and diameter. In the drawings it is shown, as made of two parts, C D, secured together by bolts, and attached to the end of a pole, A, which is lowered into the well. Over the back of the head fits a gauge, E, which is attached by means of lugs on opposite sides, having slots, L L, through which pass set-screws, $m$ $m$. This arrangement allows the gauge to be set out or in, as necessity may require. Any equivalent adjustment of the gauge may be employed. Within the head is situated an arm, F, which forms the indicator. With its upper end is connected a rod or wire, H, extending up through staples $o$ to the top of the well. The indicator is preferably provided with bearings, G G, which slide up and down in grooves M M' of the head, fig. 5, and also with a slot, K, running over a bolt, J, to gauge the protrusion of the indicator, and to form a joint to the same when down. The end of the indicator is also preferably provided with a friction-roller, $j$. The above-described arrangement of the indicator may be varied as may be desired.

The operation of this device will be readily understood. The gauge E is first adjusted to fit closely the diameter of the well, and the device is then lowered, with the indicator drawn in, as shown in fig. 1. Whenever a crevice is reached, the indicator F will drop down of its own weight and project into it, as shown in fig. 2. Then, by simply pressing the rod H down, so as to keep the indicator extended, and moving the pole up and down, so that the indicator will strike the top and bottom of the crevice, the length and position of the latter will be indicated by means of a scale of feet on the pole. By turning the device on its axis, the diameter of the crevice at different positions can also be accurately measured, and thus the size and form of the crevice will be obtained. By turning the device as it goes down, it will be seen that the crevices can be easily found if there are any.

What I claim as my invention, and desire to secure by Letters Patent, is—

1. The combination, with the head, of an adjusting-gauge, E, for adapting the device to the diameter of the bore, as specified.

2. The combination, with the head, of an indicator, F, as described, and for the purpose set forth.

JOHN D. DALE.

Witnesses:
JOHN H. DALE,
GUSTAV JANEKI.